Patented May 14, 1929.

1,713,362

UNITED STATES PATENT OFFICE.

ALOIS ZINKE AND KONRAD FUNKE, OF GRAZ, AUSTRIA, ASSIGNORS TO FELICE BENSA, OF GENOA, ITALY.

MANUFACTURE OF HIGHLY-CHLORINATED PERYLENES.

No Drawing. Original application filed June 7, 1927, Serial No. 197,229, and in Austria April 2, 1927. Divided and this application filed April 11, 1928. Serial No. 269,295.

This application is a division of our application Serial No. 197,229 filed June 7th, 1927 for manufacture of highly chlorinated perylenes.

In the processes hitherto proposed for manufacturing chlorine derivatives of perylene, it was proposed amongst others to introduce dry chlorine gas into a suspension of perylene.

The fact that perylene suspensions are dealt with renders difficult to such an extent the manufacture of predetermined products that the results of the reaction are only difficultly reproducible. Besides it is found that in this way only the known hexachloroperylene can be arrived at, on continuing the introduction of chlorine a decomposition of the perylene nucleus takes place.

The object of the present invention is the manufacture of highly chlorinated perylenes, that is to say of hepta- up to dodecachloroperylene. This object is obtained according to the invention by adding to the solution or suspension of low chlorinated perylenes that is to say di- to hexachloroperylene, a chlorine transferring agent which may be chloride of a metal such as aluminium chloride or the chloride of a so called semimetal such as pentachloride of antimony. One then succeeds in obtaining hepta- to dodecachloroperylene according to the temperature and the quantity of the chlorine caused to flow through the suspension or solution of perylene.

Example: 1 part by weight of di- or hexachloroperylene is mixed in 30 parts by weight of nitrobenzene with 1.5 parts by weight of anhydrous aluminium chloride and a current of washed and dried gaseous chlorine is caused to flow through the liquid heated to 130 to 140° centigrade during 1½ hours. The solution assumes at first a deep blue colour and turns green towards the end of the reaction.

After the mass has been left to stand for about 12 hours the deposit having separated in crystals is filtered off and thoroughly washed with hot water containing hydrochloric acid. The compound can be purified by recrystallization from nitrobenzene. The golden yellow crystals thus obtained, contain according to analysis 58.70% of chlorine. They dissolve in fuming sulphuric acid containing 25% of anhydride with a green colour.

The products obtained are to a great part not exclusively substitution products but contain besides substituent chlorine also additional chlorine.

What we claim is:

1. A process for manufacturing highly chlorinated perylenes, that is to say heptato dodecachloroperylene consisting in intimately mixing an inert liquid solvent, a chloroperylene containing not more than six atoms of chlorine and an inorganic chloride adapted to act as a chlorine transferring agent and passing through such mixture a current of dry gaseous chlorine.

2. A process for manufacturing highly chlorinated perylenes, that is to say heptato dodecachloroperylene consisting in intimately mixing an inert liquid solvent, a chloroperylene containing not more than six atoms of chlorine and an inorganic chloride adapted to act as a chlorine transferring agent such chlorine transferring agent being not less than once and not more than twice the weight of the said chloroperylene and passing through the mixture a current of dry gaseous chlorine.

3. A process for manufacturing highly chlorinated perylenes, that is to say heptato dodecachloroperylene consisting in intimately mixing an inert liquid solvent, a chloroperylene containing not more than six atoms of chlorine and an inorganic chloride adapted to act as a chlorine transferring agent heating the mixture to a temperature not higher than 140° centigrade, and passing through such mixture a current of dry gaseous chlorine.

In testimony whereof we have affixed our signatures.

ALOIS ZINKE.
KONRAD FUNKE.